US009862259B2

United States Patent
Barnes, Jr. et al.

(10) Patent No.: US 9,862,259 B2
(45) Date of Patent: Jan. 9, 2018

(54) VEHICLE WINDSHIELD PROTECTION DEVICE

(71) Applicant: Delk, Inc., Nashville, TN (US)

(72) Inventors: Raymond Don Barnes, Jr., Nashville, TN (US); Luke William Michas, Nashville, TN (US)

(73) Assignee: Delk, Inc., Nashville, TN (US)

( * ) Notice: Subject to any disclaimer, the term of this patent is extended or adjusted under 35 U.S.C. 154(b) by 0 days.

(21) Appl. No.: 15/594,403

(22) Filed: May 12, 2017

(65) Prior Publication Data

US 2017/0246941 A1    Aug. 31, 2017

Related U.S. Application Data

(63) Continuation-in-part of application No. 14/185,125, filed on Feb. 20, 2014, now abandoned.

(51) Int. Cl.
*B60J 11/08* (2006.01)

(52) U.S. Cl.
CPC ................... *B60J 11/08* (2013.01)

(58) Field of Classification Search
CPC .............. B60J 3/002; B60J 11/08; B60J 11/06
USPC ................... 296/95.1, 136.1, 136.07
See application file for complete search history.

(56) References Cited

U.S. PATENT DOCUMENTS

| 2,223,145 | A | 11/1940 | Wise |
| 2,599,066 | A | 6/1952 | Osborn |
| 4,597,608 | A | 7/1986 | Duffy |
| 4,726,406 | A | 2/1988 | Weatherspoon |
| 5,292,167 | A | 3/1994 | Hellman |
| 6,662,839 | B1 | 12/2003 | Thayer |
| 7,673,924 | B1 | 3/2010 | Lau |
| 2004/0227373 | A1 | 11/2004 | Robbins |
| 2009/0261614 | A1* | 10/2009 | Haas ................ B60J 11/08 296/95.1 |

(Continued)

FOREIGN PATENT DOCUMENTS

| AU | 3243999 | 9/1999 |
| CA | 2230258 | 9/1999 |
| CN | 201268213 | 7/2009 |

(Continued)

OTHER PUBLICATIONS

Motor Trend® Frost Guard™ with Wiper Blade Cover; Delk; 2 pages; Nashville, TN, USA; http://www.delk.us/multi_purpose_tools_FrostGuard.html.

(Continued)

*Primary Examiner* — Jason S Morrow
(74) *Attorney, Agent, or Firm* — Kevin Schraven; Lindsey Auerbach; Hankin Patent Law, APC (57) ABSTRACT

A vehicle windshield protection device. The device may comprise: a cover portion and side mirror straps. The cover portion may comprise support members configured to prevent the vehicle windshield protection device from being blown off a vehicle. The cover portion may substantially cover an outer surface of a windshield of the vehicle. The side mirror straps may engage with one or more side mirrors of the vehicle. The wind strap may engage with a top portion of a vehicle and may prevent the device from being blown off the vehicle. The cover portion is generally configured to prevent frost, ice, and snow from adhering to the windshield.

10 Claims, 4 Drawing Sheets

(56) References Cited

U.S. PATENT DOCUMENTS

2011/0109116 A1   12/2011   Mitchell

FOREIGN PATENT DOCUMENTS

| CN | 203110900 | 8/2013 |
| EP | 0888919 | 1/1999 |
| JP | H11115502 | 4/1999 |
| JP | 2006035919 | 2/2006 |
| WO | WO1999044850 | 9/1999 |
| WO | 2005049356 | 6/2005 |

OTHER PUBLICATIONS

Never Scrape Frost, Ice or Snow Again! Frost Blocker Fits Cars, Trucks & SUVs; 2 pages; Nashville, TN, USA; http://www.frostblocker.com.
2-Pack of WinterShield Windshield Covers; Groupon; 3 pages; http://www.groupon.com/deals/gg-2-pack-of-winter-windshield-covers.
PCT International Search Report, International Application No. PCT/US2014/068574, dated Mar. 10, 2015.

* cited by examiner

VEHICLE WINDSHIELD PROTECTION DEVICE

CROSS-REFERENCE TO RELATED APPLICATIONS

The Application is a continuation-in-part of U.S. Non-Provisional patent application Ser. No. 14/185,125, filed on Feb. 20, 2014, titled "VEHICLE WINDSHIELD PROTECTION DEVICE", by inventors Raymond Don Barnes, the contents of which are expressly incorporated herein by this reference, and to which priority is claimed.

FIELD OF THE INVENTION

The present disclosure generally relates to devices for covering glass in order to protect the glass from the elements. More particularly, the present disclosure generally relates to a vehicle windshield cover that prevents ice, snow, and frost from covering the vehicles front windshield when the vehicle is not in use.

BACKGROUND OF THE INVENTION

Currently, several commercially available products are available for preventing ice, snow, and frost build-up on the windshield of a parked vehicle, such as a car. However, these products are deficient because: (1) they generally fail to securely stay in place during strong wind gusts; (2) they generally fail to cover the entire windshield; and (3) they are usually made from inferior materials.

Thus, what is needed is an improved windshield cover that fully and firmly covers the entire windshield of a vehicle.

SUMMARY OF THE INVENTION

To minimize the limitations in the prior art, and to minimize other limitations that will become apparent upon reading and understanding the present specification, the present disclosure discloses a new and useful vehicle windshield protection device.

One embodiment may be a vehicle windshield protection device, comprising: a cover portion; one or more side mirror straps; and one or more support members; wherein the cover portion may comprise a top end, a bottom end, a first side, and a second side such that there is a first top corner, a second top corner, a first bottom corner, and a second bottom corner; wherein the cover portion substantially covers an outer surface of a windshield of a vehicle and one or more windshield wipers of the vehicle; wherein the one or more support members may be located at one or more of the two side ends and may keep the vehicle windshield protection device covering the windshield of the vehicle; wherein the one or more side mirror straps may engage with one or more side mirrors of the vehicle; and wherein the cover portion substantially prevents frost, ice, and snow from adhering to the windshield and the one or more windshield wipers. The one or more side mirror straps may comprise a first full length side strap, a second full length side strap, a first side mirror strap, a second side mirror strap, and four horizontal mirror straps. The first full length side strap and the first side mirror strap may be both connected to the cover portion at approximately the first top corner and the first bottom corner, and the second full length side strap and the second side mirror strap may be both connected to the cover portion at approximately the second top corner and the second bottom corner. The two of the horizontal mirror straps may be substantially parallel to each other and may be connected to the first side of the cover portion and the first side mirror strap, and wherein another two of the horizontal mirror straps may be substantially parallel to each other and may be connected to the second side of the cover portion and the second side mirror strap. The cover portion may be comprised of a Polyvinyl Chloride coating, wherein the Polyvinyl Chloride coating allows the cover portion remain flexible in temperatures below 0° C.

In another embodiment, the one or more side mirror straps comprise a first side mirror strap, a second side mirror strap, four horizontal mirror straps, a first vertical connector strap, and a second vertical connector strap. The first side mirror strap may be connected to the cover portion at approximately the first top corner and the first bottom corner, and the second side mirror strap may be connected to the cover portion at approximately the second top corner and the second bottom corner. The two of the horizontal mirror straps may be substantially parallel to each other and may be connected to the first side of the cover portion and the first side mirror strap, and wherein another two of the horizontal mirror straps may be substantially parallel to each other and may be connected to the second side of the cover portion and the second side mirror strap. The first vertical connector strap may be substantially perpendicular to and connected to the two of the horizontal mirror straps that may be connected to the first side of the cover portion, and wherein the second vertical connector strap may be substantially perpendicular to and connected to the two of the horizontal mirror straps that may be connected to the first side of the cover portion. The vehicle windshield protection device may further comprise: one or more side flaps; and one or more side flap support members. The one or more side flaps may engage with an interior of the vehicle. Each of the one or more side flap support members may be connected at a distal end of each of the one or more side flaps. The one or more side flaps and the one or more support members may prevent the vehicle windshield protection device from being inadvertently removed from the vehicle. The cover portion may be comprised of a Polyvinyl Chloride coating, wherein the Polyvinyl Chloride coating makes the cover portion remain flexible in temperatures below 0° C.

In another embodiment the vehicle windshield protection device may further comprise one or more side flaps; and one or more side flap support members; wherein the one or more side flaps may engage with an interior of the vehicle; wherein each of the one or more side flap support members may be connected at a distal end of each of the one or more side flaps; and wherein the one or more side flaps and the one or more support members may prevent the vehicle windshield protection device from being inadvertently removed from the vehicle. The cover portion may be comprised of a Polyvinyl Chloride coating, wherein the Polyvinyl Chloride coating makes the cover portion remain flexible in temperatures below 0° C.

Another embodiment may be a vehicle windshield protection device comprising: a cover portion; and two side flaps; wherein the cover portion may substantially cover an outer surface of a windshield of a vehicle; wherein the cover portion substantially prevents frost, ice, and snow from adhering to the windshield; wherein the two side flaps may engage with an interior of the vehicle, such that two vehicles doors are closed on the two side flaps, the vehicle windshield protection devices may be substantially prevented from being removed from the vehicle. The two side flaps may extend from two side ends of the cover portion and the two side flaps may have a length that may be at least greater than half a length of the two side ends. Preferably the length of the two side flaps is almost as long as the length of the two side ends. The cover portion may be comprised of a Polyvinyl Chloride coating, wherein the Polyvinyl Chloride coating makes the cover portion remain flexible in temperatures below 0° C. The vehicle windshield protection device may further comprise: two support members; and two side flap support members; wherein the one or more support members may be located at the two side ends and may keep the vehicle windshield protection device covering the windshield of the vehicle; wherein the two side flap support members prevent the vehicle windshield device from being removed from the vehicle without opening the two vehicle doors. The cover portion may be comprised of a Polyvinyl Chloride coating, wherein the Polyvinyl Chloride coating allows the cover portion remain flexible in temperatures below 0° C.

It is an object to provide a vehicle windshield protection device or cover that covers the entire windshield of the vast majority of vehicles, including trucks and SUVs.

It is an object to provide a vehicle windshield protection device that is made from materials that safely and effectively protect the vehicle windshield.

It is an object to provide a vehicle windshield protection device that remains firmly attached to a vehicle under strong winds.

It is an object to provide a vehicle windshield protection device that is easy to store.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the figures, and the detailed descriptions thereof, are to be regarded as illustrative in nature and not restrictive. Also, the reference or non-reference to a particular embodiment of the invention shall not be interpreted to limit the scope of the invention.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Figure 1:
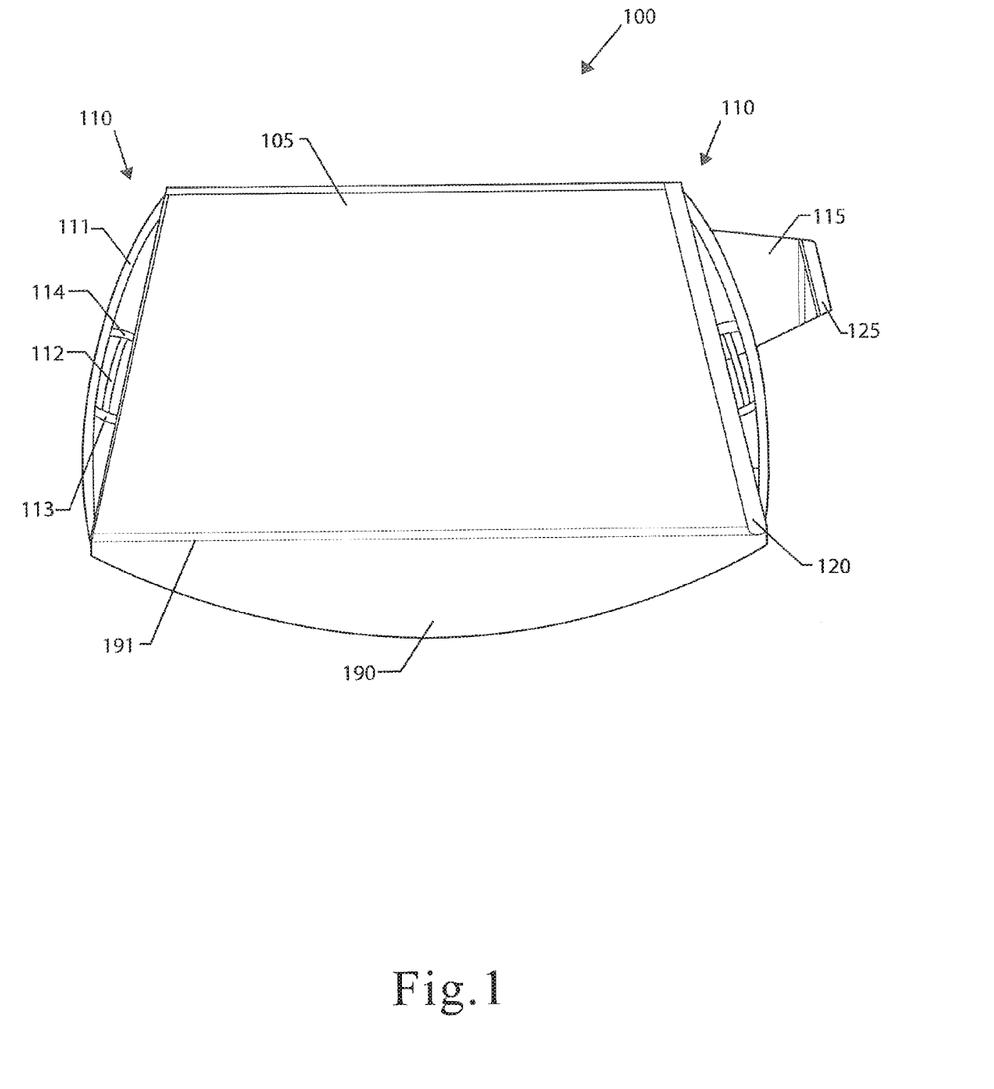
FIG. 1 is an illustration of a view of one embodiment of the vehicle windshield protection device showing side mirror straps and a side flap.

FIG. 1 is an illustration of a perspective view of one embodiment of the vehicle windshield protection device showing side mirror straps and a side flap. As shown in FIG. 1, the vehicle windshield protection device 100 may comprise: a cover portion 105, side mirror strap systems 110, security side flap 115, support member 120, security side flap support member 125. As shown, the cover portion 105 may be configured to substantially cover an outer surface of a windshield of a vehicle. The cover portion 105, which is shown as a single piece in FIG. 1, may be more than one piece. The purpose of the cover portion 105 is to substantially prevent frost, ice, and snow from adhering to the windshield. The cover portion 105 is most effective at preventing ice or frost build up when it maintains direct contact with the glass of the windshield. In order to do this, the cover portion 105 is held firmly in place by a series of straps, including side mirror strap systems 110, one or more side flaps 115, and support member 120. However, as shown in the other FIGS., not all the straps and/or flaps need be used in every embodiment. It should be understood that although FIG. 1 shows two side mirror strap systems 110 and one side flap 115, the side mirror strap systems 110 and side flap 115 may be as few as one of each or more than two. The side mirror strap systems 110 may be configured to engage with one or more side mirrors of a vehicle. In this manner, the device 100 may removably connect to the vehicle and may be held firmly and securely in place. The side mirror strap systems 110 are preferably made from high grade elastic that allows them to returnably stretch and hook around the side mirrors or other vehicle parts while holding the cover portion 105 taut. In a preferred embodiment, the elastic can withstand low and high temperatures and repeated donning and removal.

The side flap 115 may be configured to pass through the interior of a vehicle and prevent the vehicle windshield protection device 100 from being blown off the vehicle. The side flap 115 may also prevent the vehicle windshield protection device 100 from being stolen from the vehicle. The side flap 115 may be removably attached to the cover portion 105, but it is preferably permanently and very securely attached. The side flap 115 may be folded into the vehicle when the vehicle door is open, and then the vehicle door may completely close, trapping and physically securing the side flap 115 partially inside the vehicle. The support member 125, in this manner, is inside the vehicle, and may be rigid rod or other dowel type structure that prevents the side flap 115 from being pulled out of the car when the door is shut.

As shown in FIG. 1, the support member 120, which may be a rigid rod or other dowel type structure, may provide side support to the cover portion 105. The support members 120, 125 may preferably be made from any synthetic or semi-synthetic material. The support member 120 may preferably extend along one side of the cover portion. In some embodiments there may be more than one support member and more than one side flap.

The cover portion 105 may include or also be held firmly in place by mirror covers (not shown). The mirror covers may be configured to engage with one or more side mirrors of a vehicle. In this manner, the vehicle windshield protection device 100 may removably connect to the vehicle and may be held firmly and securely in place.

The mirror covers may be removably attached to cover portion 105 or another portion of the vehicle windshield protection device 100. Any removably attachment device may be used, including without limitation, hook and eye, hook and loop fasteners, snaps, latches, buttons, or the like. The side mirrors of a vehicle may preferably fit into an opening on the mirror covers such that the entire mirror may be covered by the mirror cover. The mirror covers may be configured to fit around most side vehicle mirrors. The mirror covers may generally protect the mirrors from frost, ice, and snow.

The device 100 may also include a windshield wiper flap 190, which may substantially prevent frost, ice, and snow from adhering to one or more windshield wipers. As shown in FIG. 1, the windshield wiper flap 190 is at a bottom of cover portion 105, which may be joined at a bend 191.

The cover portion 105 and/or the windshield wiper flap may comprise a Polyvinyl Chloride (PVC) coating. The PVC coating may generally help the cover portion 105 and/or windshield wiper flap remain flexible in temperatures below 0° C. and generally make the cover portion 105 extremely durable and water resistant. The PVC coating may be on an interior surface of the cover portion 105, such that the PVC coating directly contacts the vehicle windshield. The cover portion 105 may be made from one or more layers of a durable, weather resistant material such as canvas, which may then be coated with the PVC coating.

FIG. 1 also shows how the side strap mirror systems may each comprise a full length strap 111, which extends from a top to a bottom of the cover portion 105. The side strap mirror systems may also comprise two horizontal straps 114 and 113 and vertical connector strap 112. As shown, the horizontal straps 113 and 114 extend from a side of the cover portion 105 and connect to the full length strap 111. Vertical connector strap 112 may preferably connect the two horizontal straps 113 and 114. This configuration allows the user to fit the side strap mirror systems onto a wide variety of cars from small cars to large trucks.

Figure 2:
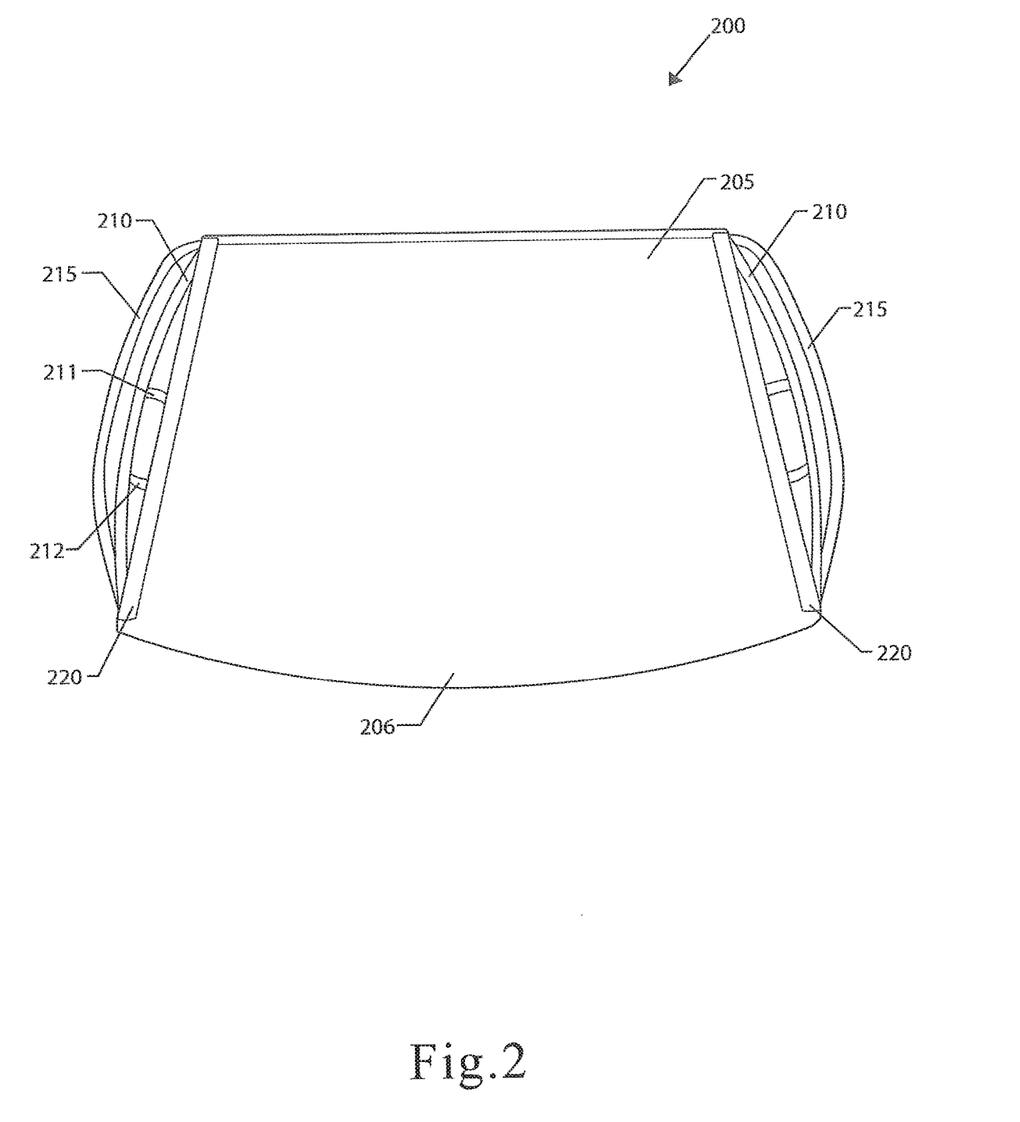
FIG. 2 is an illustration of a view of another embodiment of the vehicle windshield protection device showing side mirror straps and side straps.

FIG. 2 is an illustration of a perspective view of another embodiment of the vehicle windshield protection device showing a side mirror strap and a side strap. As shown in FIG. 2, the vehicle windshield protection device 200 may comprise: a cover portion 205, side mirror straps 210, full length side straps 215, horizontal mirror straps 211, 212, and support members 220. The cover portion 205 may be held firmly in place by a series of straps, including the side mirror straps 210, horizontal mirror straps 211, 212, and full length side straps 215. It should be understood, however, that although FIG. 2 shows two side mirror straps 210 and two side straps 215, there may be as few as one or more than two. The side mirror straps 210 and the full length side straps 215 may be configured to engage with one or more side mirrors of a vehicle. In one embodiment, the full length side straps 215 may be configured to engage with one or more side mirrors of a large vehicle, such as a truck or SUV. In this manner, the device 200 removably connects to the vehicle and is held firmly and securely in place on an oversize vehicle. The side mirror straps 210 and horizontal mirror straps 211, 212 are configured to removeably connect to the mirrors of a smaller vehicle such as a sedan or compact car. Having both (1) the side mirror straps 210 and horizontal mirror straps 211, 212 and (2) the full length side straps 215, allows the device 200 to be used on a variety of sizes of vehicles from very large to very small.

The side mirror straps 210, horizontal mirror straps 211, 212, and the side straps 215 are preferably made from high grade elastic that allows them to returnably stretch and hook around the side mirrors or other vehicle parts while holding the cover portion 205 taut. In a preferred embodiment, the elastic can withstand low and high temperatures and repeated donning and removal.

As shown in FIG. 2, the support members 220, which may be a rigid rod or other dowel type structure, may provide side support to the cover portion 205 on both sides of cover portion 205. The support members 220 may preferably be made from any synthetic or semi-synthetic material, including wood, plastic, or metal. The support members 220 may preferably extend along both sides of the cover portion.

FIG. 2 shows how the cover portion 205 may have a substantially straight on the top and rounded on the bottom 206, such that the windshield wipers of the vehicle may be covered.

Figure 3:
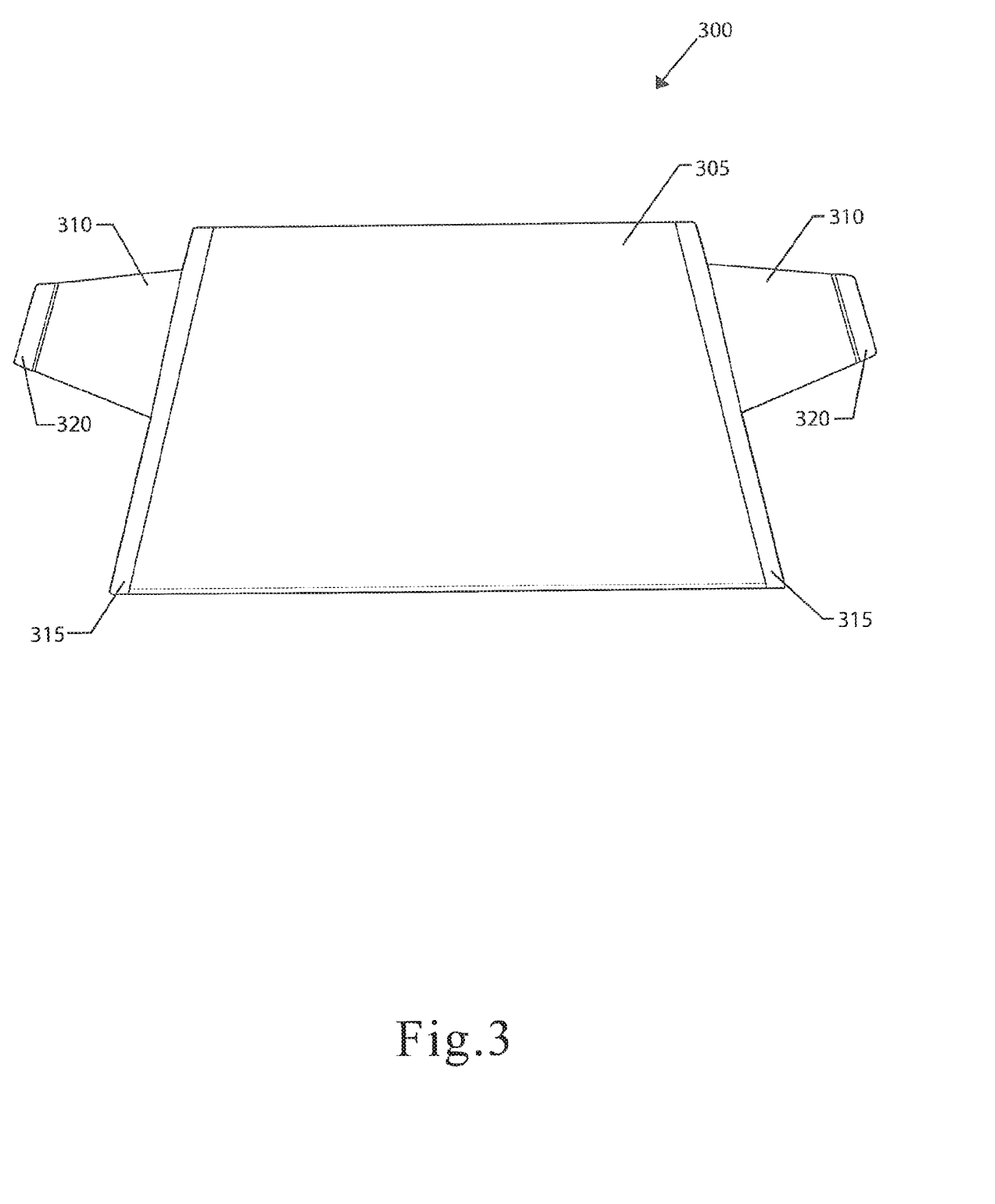
FIG. 3 is an illustration of a view of another embodiment of the vehicle windshield protection device showing side flaps.

FIG. 3 is an illustration of a perspective view of another embodiment of the vehicle windshield protection device showing side flaps and support members. As shown in FIG. 3, the vehicle windshield protection device 300 may comprise: a cover portion 305, side flaps 310, and support members 315, 320. The side flaps 310 may be configured to pass through the interior of a vehicle and prevent the vehicle windshield protection device 300 from being blown off the vehicle. The side flaps 310 may also prevent the vehicle windshield protection device 300 from being stolen from the vehicle. The side flaps 310 are preferably permanently and very securely attached to cover portion 305. The side flaps 310 may be folded into the vehicle when the vehicle doors are open, and then the vehicle doors may completely close, trapping and physically securing the side flaps 310 partially inside the vehicle. The support members 320, in this manner, are inside the vehicle, and may be rigid rod or other dowel type structures that prevent the side flaps 310 from being pulled out of the car when the door is shut.

As shown in FIG. 3, the support members 315, 320 may provide side support to the cover portion 305, such that the cover portion is held firmly and securely in place over the vehicle windshield when in use.

Figure 4:
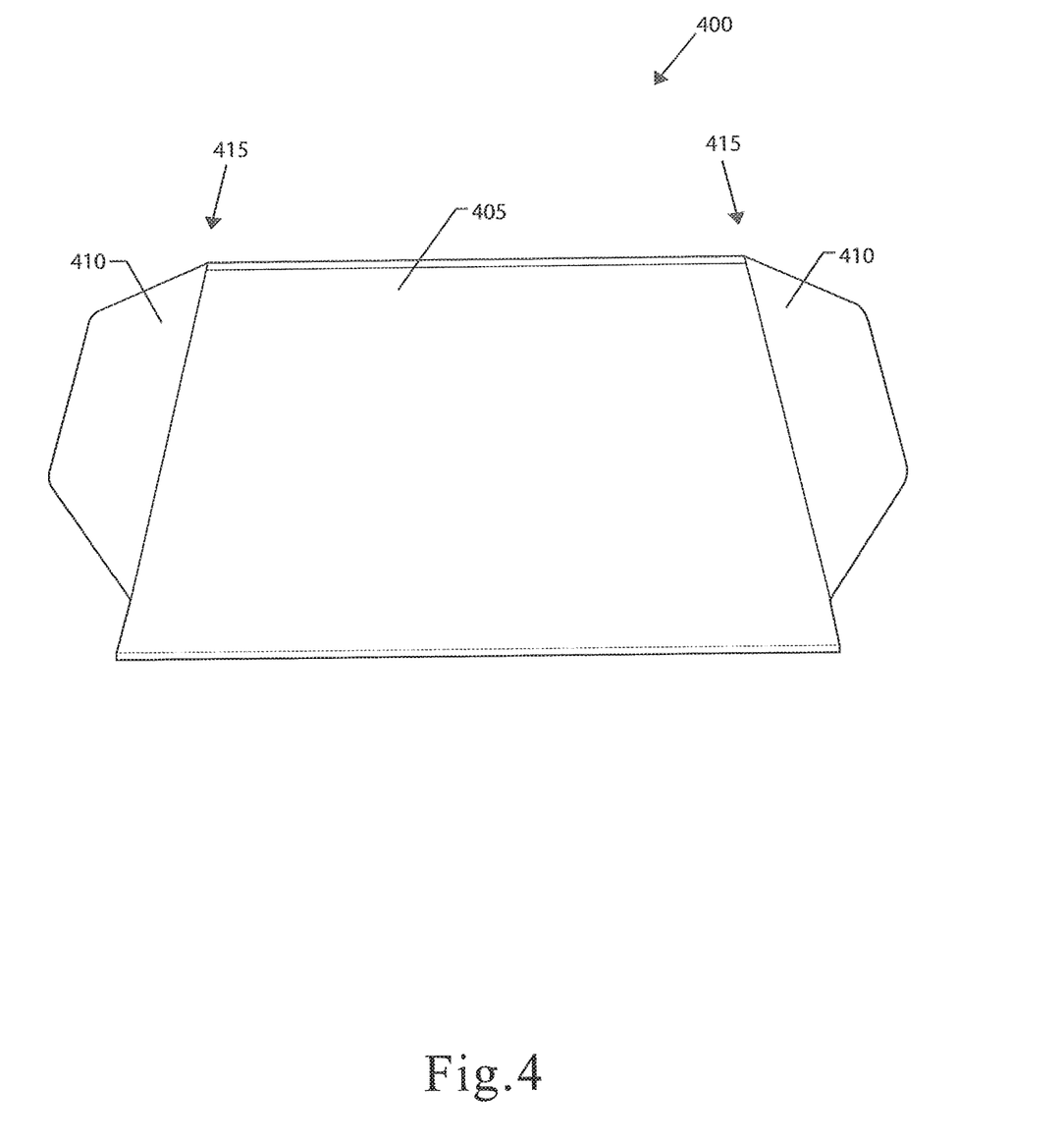
FIG. 4 is an illustration of a view of another embodiment of the vehicle windshield protection device showing side panels.

FIG. 4 is an illustration of a perspective view of another embodiment of the vehicle windshield protection device showing side panels. As shown in FIG. 4, the vehicle windshield protection device 400 may comprise: a cover portion 405 and side panels 410. The cover portion 405 may be held firmly in place on a vehicle windshield by the side panels 410. The side panels 410 may preferably extend along more than at least half the height of the sides 415 of the cover portion 405. The side panels 410 may be configured to pass through the interior of a vehicle when the doors are open and be closed upon by the vehicle door, thus preventing the vehicle windshield protection device 400 from being blown off or otherwise inadvertently removed from the vehicle. The side panels 410 may be removably attached to the cover portion 405. The side panels 410 may also prevent the vehicle windshield protection device 400 from being stolen from the vehicle, when permanently attached to the cover portion. In this embodiment, the device 400 does not have any support members and can be folded or rolled up for storage.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. An improved vehicle windshield protection device comprising:
   a cover portion;
   one or more side mirror straps; and
   one or more support members;
   wherein said cover portion comprises a top end, a bottom end, a first side, and a second side such that there is a first top corner, a second top corner, a first bottom corner, and a second bottom corner;
   wherein said cover portion substantially covers an outer surface of a windshield of a vehicle and one or more windshield wipers of said vehicle;
   wherein said one or more support members are located at one or more of said first side and said second side and keep said vehicle windshield protection device covering said windshield of said vehicle;
   wherein said one or more side mirror straps engage with one or more side mirrors of said vehicle;
   wherein said cover portion substantially prevents frost, ice, and snow from adhering to said windshield and said one or more windshield wipers;
   wherein said one or more side mirror straps comprise a first full length side strap, a second full length side strap, a first side mirror strap, a second side mirror strap, and four horizontal mirror straps.

2. The vehicle windshield protection device of claim 1, wherein said first full length side strap and said first side mirror strap are both connected to said cover portion at approximately said first top corner and said first bottom corner, and said second full length side strap and said second side mirror strap are both connected to said cover portion at approximately said second top corner and said second bottom corner.

3. The vehicle windshield protection device of claim 2, wherein two of said horizontal mirror straps are substantially parallel to each other and are connected to said first side of said cover portion and said first side mirror strap, and wherein another two of said horizontal mirror straps are substantially parallel to each other and are connected to said second side of said cover portion and said second side mirror strap.

4. The vehicle windshield protection device, according to claim 2,
   wherein said cover portion is comprised of a Polyvinyl Chloride coating;
   wherein said Polyvinyl Chloride coating makes said cover portion remain flexible in temperatures below 0° C.

5. An improved vehicle windshield protection device comprising:
   a cover portion;
   one or more side mirror straps; and
   one or more support members;
   wherein said cover portion comprises a top end, a bottom end, a first side, and a second side such that there is a first top corner, a second top corner, a first bottom corner, and a second bottom corner;
   wherein said cover portion substantially covers an outer surface of a windshield of a vehicle and one or more windshield wipers of said vehicle;
   wherein said one or more support members are located at one or more of said first side and said second side and keep said vehicle windshield protection device covering said windshield of said vehicle;

wherein said one or more side mirror straps engage with one or more side mirrors of said vehicle;

wherein said cover portion substantially prevents frost, ice, and snow from adhering to said windshield and said one or more windshield wipers;

wherein said one or more side mirror straps comprise a first side mirror strap, a second side mirror strap, four horizontal mirror straps, a first vertical connector strap, and a second vertical connector strap.

6. The vehicle windshield protection device of claim 5, wherein said first side mirror strap is connected to said cover portion at approximately said first top corner and said first bottom corner, and said second side mirror strap is connected to said cover portion at approximately said second top corner and said second bottom corner.

7. The vehicle windshield protection device of claim 6, wherein two of said horizontal mirror straps are substantially parallel to each other and are connected to said first side of said cover portion and said first side mirror strap, and wherein another two of said horizontal mirror straps are substantially parallel to each other and are connected to said second side of said cover portion and said second side mirror strap.

8. The vehicle windshield protection device of claim 7, wherein said first vertical connector strap is substantially perpendicular to and connected to said two of said horizontal mirror straps that are connected to said first side of said cover portion, and wherein said second vertical connector strap is substantially perpendicular to and connected to said two of said horizontal mirror straps that are connected to said first side of said cover portion.

9. The vehicle windshield protection device of claim 8, further comprising:

one or more side flaps; and one or more side flap support members;

wherein said one or more side flaps engage with an interior of said vehicle;

wherein each of said one or more side flap support members are connected at a distal end of each of said one or more side flaps; and wherein said one or more side flaps and said one or more support members prevent said vehicle windshield protection device from being inadvertently removed from said vehicle.

10. The vehicle windshield protection device, according to claim 9, wherein said cover portion is comprised of a Polyvinyl Chloride coating;

wherein said Polyvinyl Chloride coating makes said cover portion remain flexible in temperatures below 0° C.

* * * * *